United States Patent [19]
Kobayashi

[11] Patent Number: 5,414,536
[45] Date of Patent: May 9, 1995

[54] IMAGE READER HAVING THE ABILITY TO CORRECT IMAGING PERFORMANCE TO DUE FIELD ANGLE FOCUS VARIATIONS

[75] Inventor: Yuji Kobayashi, Kanagawa, Japan

[73] Assignee: Fuji Xerox Co., Ltd., Tokyo, Japan

[21] Appl. No.: 95,248

[22] Filed: Jul. 22, 1993

[30] Foreign Application Priority Data
Jul. 23, 1992 [JP] Japan .................. 4-218367

[51] Int. Cl.⁶ .................. H04N 1/028; H04N 1/04
[52] U.S. Cl. .................. 358/504; 358/515; 358/518; 358/406; 358/480; 358/482; 358/494
[58] Field of Search ............... 358/406, 447, 474, 494, 358/480, 482, 504, 515, 518; 250/201.2, 201.4

[56] References Cited
U.S. PATENT DOCUMENTS
4,746,948 5/1988 Matsui .................. 250/201.2
5,191,439 3/1993 Sumi .................. 358/447

FOREIGN PATENT DOCUMENTS
2-146571 6/1990 Japan .

OTHER PUBLICATIONS
Makoto Nagao, "Digital Image Processing," Kindai Kagaku Corporation, Dec. 10, 1978.

Primary Examiner—Scott A. Rogers
Attorney, Agent, or Firm—Finnegan, Henderson, Farabow, Garrett & Dunner

[57] ABSTRACT

An image reader operative to correct the decay of image caused by an optical imaging system comprises position detection means for detecting the position of an image signal on an image sensor, by which the image signal is produced, along its scanning direction, imaging performance setting means for setting imaging performance information of the optical imaging system for the position of image signal detected by the position detection means, and decay correction means for correcting the decay of image signal in accordance with the imaging performance information set by the imaging performance setting means. For a color image reader, the imaging performance information is set by the imaging performance setting means for each color component detected by a color component detection means, and decay correction means corrects the decay of image signal of each color component.

6 Claims, 9 Drawing Sheets

IMAGE READER HAVING THE ABILITY TO CORRECT IMAGING PERFORMANCE TO DUE FIELD ANGLE FOCUS VARIATIONS

BACKGROUND OF THE INVENTION

1. Field of the Invention

The present invention relates to an image reader, and particularly to the improvement of image readers of the type in which the image of an original text is formed on a linear image sensor by means of an optical imaging system.

2. Description of the Prior Art

Conventional image readers of this type are designed to read an original text placed on a platen by projecting a slit-shaped light beam produced by an illumination light source onto the entire text surface continuously and focusing the reflected slit-shaped light beam from the text surface on a linear image sensor by means of an optical imaging system. However, the text image formed on the linear image sensor generally decays (curvature of field) due to the presence of the optical imaging system, and therefore the image signal produced by the image sensor also decays.

This problem has been overcome conventionally through the high-band emphasizing process called MTF (Modulation Transfer Function) correction process for the crude image signal produced by the image sensor so that the decay of image is corrected (refer to publication entitled "Digital Image Processing", written by Makoto Nagao, published by Kindai Kagaku Corp. on Dec. 10, 1978, for example).

However, the decayed image correction scheme of the conventional image sensor is intended to act on the image sensor output invariably, instead of treating image information on a case by case basis, and therefore it is not yet satisfactory for the delivery of high quality image information.

Specifically, the optical imaging system of the conventional image reader has an imaging performance (MTF) which varies depending on the direction of field angle of the focus lens (parallel to the scanning direction of the image sensor), as shown in FIG. 12. Therefore, a constant decay correction process does not clear the image signal of the focus error distributed along the field angle direction of the focus lens, and the system fails to provide high quality image information.

Particularly, in a color image reader, the focus lens has different imaging performances (MTF) for separate color components, i.e., red (R), green (G) and blue (B), as shown in FIG. 13, and therefore even after the constant image decay correction process for the image signal, the focus error which is dependent on the color component is left undissolved in addition to the focus error which is dependent on the field angle of the focus lens. Accordingly, conventional color image readers involve the serious technical subject of drawing high quality image information from original texts.

SUMMARY OF THE INVENTION

The present invention is intended to overcome the foregoing prior art problems, and its prime object is to provide an image reader capable of correcting the decay of image caused by the optical imaging system and drawing high quality image information from an original text image.

In order to achieve the above objective, the present invention resides in an image reader, as shown in FIG. 1, which reads an original text 2 placed on a platen 1 by projecting a slit-shaped light beam produced by an illumination light source 3 onto the entire text surface continuously and focusing the reflected slit-shaped light beam from the text surface on a linear image sensor 5 by means of an optical imaging system 4, wherein the image reader further includes a position detection means 6 which detects the position of the image signal on the image sensor 5, by which the image signal is produced, along its scanning direction, an imaging performance setting means 8 which sets imaging performance information of the optical imaging system 4 for the image signal position detected by the position detection means 6, and a decay correction means 9 which corrects the decay of image signal in accordance with the imaging performance information set by the imaging performance setting means 8.

The present invention also resides in a color image reader, as shown in FIG. 1, which reads an original text 2 placed on a platen 1 by projecting a slit-shaped light beam produced by an illumination light source 3 onto the entire text surface continuously and focusing the reflected slit-shaped light beam from the text surface on a linear image sensor 5 by means of an optical imaging system 4, wherein the color image reader further includes a position detection means 6 which detects the position of the image signal on the image sensor 5, by which the image signal is produced, along the scanning direction, a color component detection means 7 which detects color components of the image signal, an imaging performance setting means 8 which sets imaging performance information of the optical imaging system 4 for the image signal position detected by the position detection means 6 and for each color component detected by the color component detection means 7, and a decay correction means 9 which corrects the decay of image signal of each color component in accordance with the imaging performance information set by the imaging performance setting means 8.

In the above-mentioned arrangement, the position detection means 6 can be a means which bases the operation of detecting the image signal position along the scanning direction of image sensor on counting the read clock of the image sensor 5, for example.

The color component detection means 7 can be selected from among means of detecting color components of the image signal produced by the image sensor 5. For example, in case the image reader employs a single image sensor and colors are separated for the image signal produced by the sensor, the color component detection means 7 detects each color component based on the timing of color separation or based on the output port of color separation means, or in case the image reader employs image sensors for individual color components, the color component detection means 7 simply detects color components based on each image sensor which provides the image signal.

The imaging performance setting means 8 is preferably designed to read an imaging performance assessment pattern and calculate the imaging performance information based on it when the criterion is set to the accuracy, or preferably designed to memorize imaging performance information which has been measured in advance with a standard measuring system and read out the information from the memory when the criterion is set to the simplicity of arrangement.

The decay correction means 9 can be selected from among means of selecting a factor of a digital filter based on the imaging performance for a certain pixel position and correcting the image signal by the digital filter. From the viewpoint of enhancing the image quality, it is desirable to vary the degree of correction for the image signal in steps depending on the operational mode such as the edge emphasis mode and graphics mode.

In operation, the position detection means 6 detects the position of the image signal on the image sensor 5 along the scanning direction, the imaging performance setting means 8 sets the imaging performance information of the optical imaging system 4 for the position of image signal detected by the position detection means 6, and the decay correction means 9 corrects the decay of image signal in accordance with the imaging performance information set by the imaging performance setting means 8.

In the case of the color image reader, the color component detection means 7 detects color components of the image signal read by the image sensor 5, the imaging performance setting means 8 sets the imaging performance information of the optical imaging system 4 for the position of image signal detected by the position detection means 6 and for the color component detected by the color component detection means 7, and the decay correction means 9 corrects the decay of image signal in accordance with the imaging performance information of each color component set by the imaging performance setting means 8.

Through the provision of a selection means 10, it becomes possible to alter the degree of correction implemented by the decay correction means 9.

DESCRIPTION OF THE PREFERRED EMBODIMENTS

Embodiments of this invention will be explained in detail with reference to the drawings.

Embodiment 1

Figure 1:
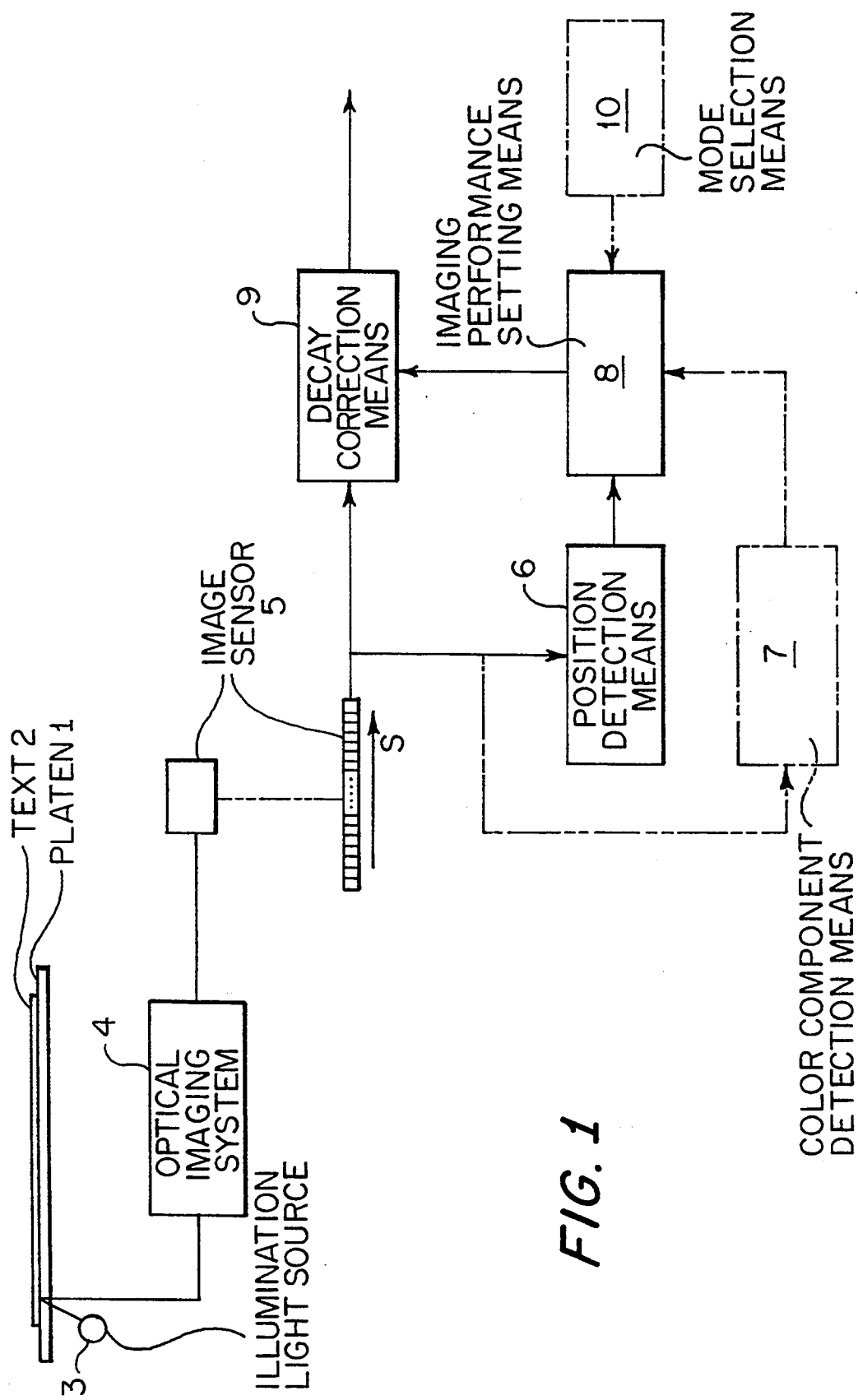
FIG. 1 is a block diagram showing the arrangement of the image reader based on this invention.
Figure 2:
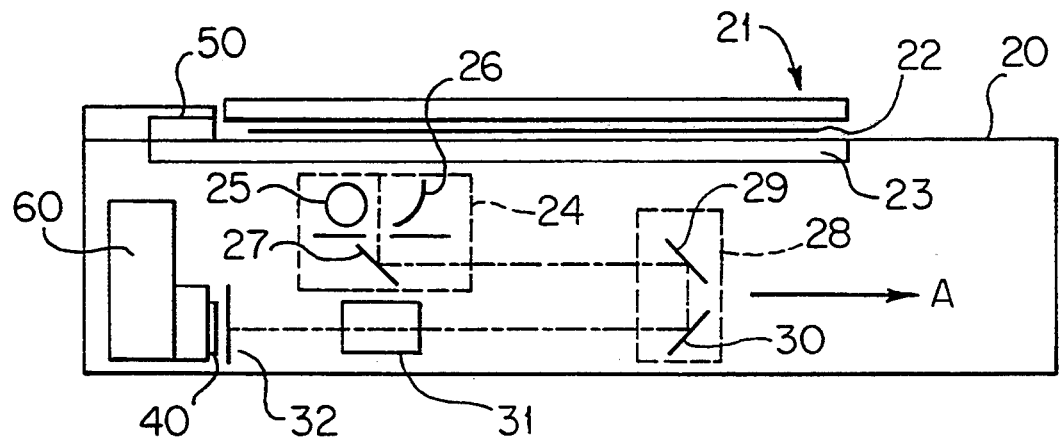
FIG. 2 is a diagram showing the structure of the image reader based on a first embodiment of this invention.
Figure 3:
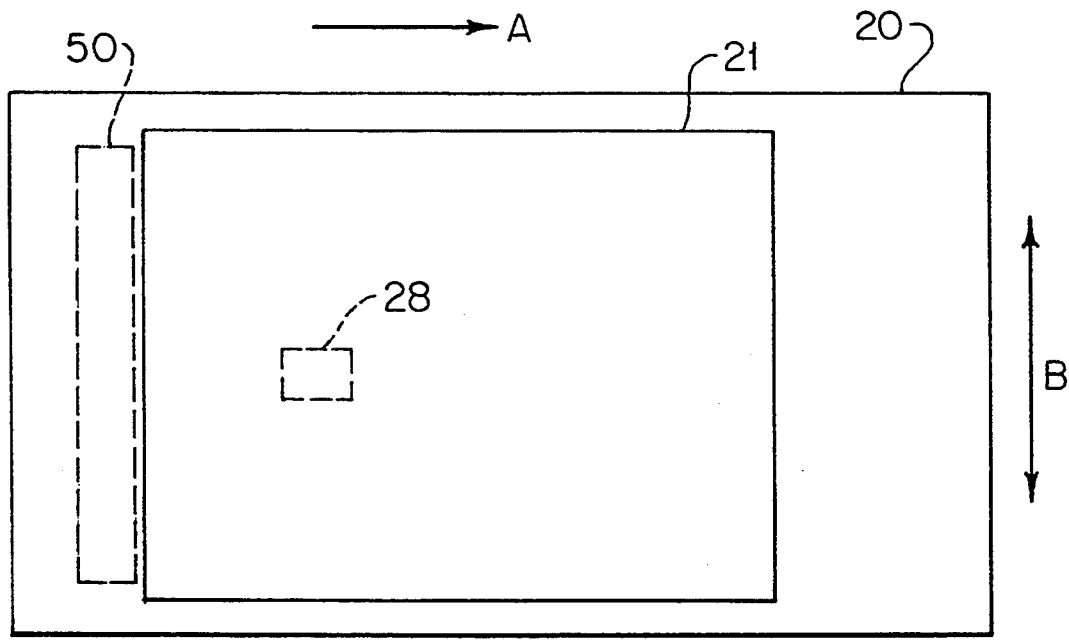
FIG. 3 is a plan view of this image reader.
Figure 4:
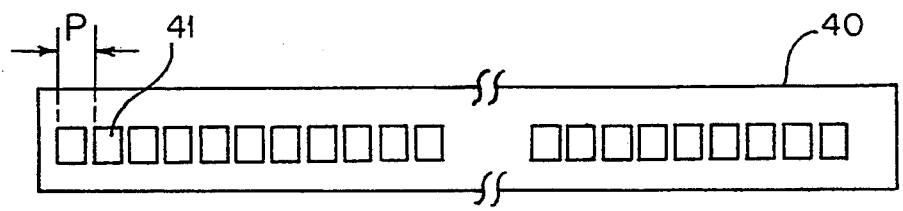
FIG. 4 is a diagram explaining the image sensor based on the first embodiment.

FIG. 2 and FIG. 3 show the image reader based on the first embodiment of this invention. In the figures, reference numeral 20 denotes the image reader, in which an original text 22 is placed on a platen 23 made of a glass plate and fixed on it by a text holder 21, and the entire surface the text 22 is illuminated continuously by a slit-shaped light beam produced by a light source 25 which is a halogen lamp. Indicated by 26 is a reflector which converges the light of the halogen lamp on the text portion to be illuminated.

The reflected light from the text surface is conducted through an optical imaging system including mirrors 27, 29 and 30, a focus lens 31 and infrared-ray cutting filter 32, and focused on an image sensor 40.

In this embodiment, the halogen lamp 25, reflector 26 and mirror 27 are mounted on a full-rate carriage 24, and the mirrors 29 and 30 are mounted on a half-rate carriage 28. The full-rate carriage 24 and half-rate carriage 28 move at a speed ratio of 2:1 to scan the text 22 in the direction shown by the arrow A in FIG. 3, and the image sensor 40 reads the image on the entire area of the text 22.

In this embodiment, the image sensor 40 consists of three sensor lines sensitive to the three primary color components, and each sensor line is formed of an alignment of CCDs (charge coupled devices) 41 disposed at a constant pitch p ($p \simeq 8$ lm in this embodiment), with a filter for the red (R), green (G), or blue (B) component being disposed in front of it, so that these alignments of CCDs 41 transduce respective color components into image signals.

Figure 5:
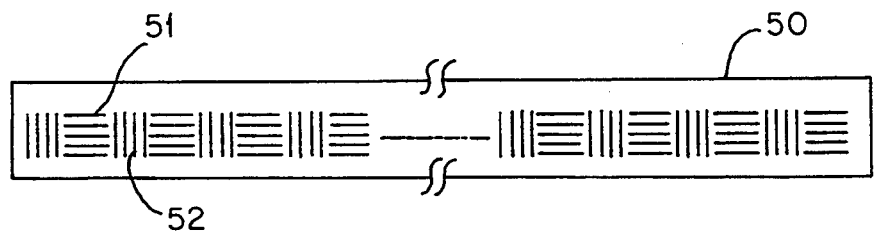
FIG. 5 is a diagram explaining an example of the imaging performance assessment pattern based on the first embodiment.

In this embodiment, an imaging performance assessment pattern 50 is placed along the field angle direction of the optical imaging system (scanning direction of image sensor shown by the arrow B in FIG. 3) in an portion of the platen 23 which is not used for the text 22. The imaging performance assessment pattern 50 used in this embodiment is a cyclic and alternate arrangement of a ladder pattern 51 of 41$p$ (line pair)/mm parallel to the field angle direction of the optical imaging system and a ladder pattern 52 of 41$p$ (line pair)/mm perpendicular to the field angle direction, as shown in FIG. 5.

Figure 6:
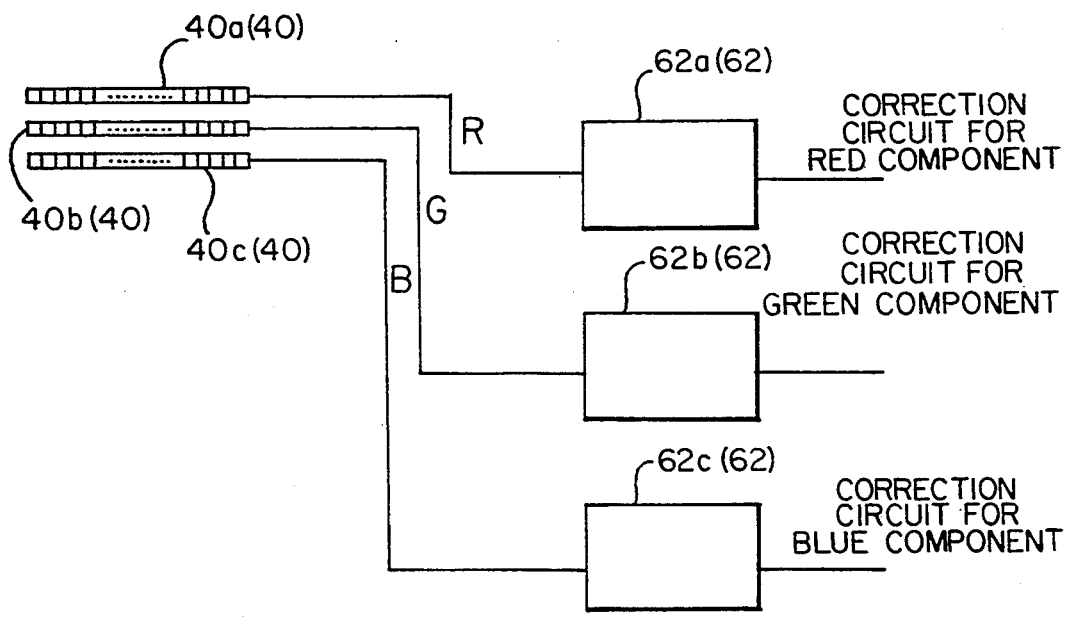
FIG. 6 is a block diagram of the signal processing system based on the first embodiment.

FIG. 6 shows the signal processing system 60 of the image sensor 40. The signal processing system 60 of the image sensor 40 includes correction circuits 62, i.e., a circuit 62a for correcting the decay of red component, a circuit 62b for the green component and a circuit 62c for the blue component, for the image signals provided by the image sensor 40, i.e., a sensor line 40a for red component, a sensor line 40b for green component and a sensor line 40c for blue component. The signal processing system 60 reads the imaging performance assessment pattern 50 prior to the reading of the text 22 so as to receive imaging performance information of the optical imaging system, and thereafter reads image information of the text 22 and corrects it based on the imaging performance information.

Although the image sensor 40 has 3-channel parallel outputs in this embodiment, the output signals may be led out of even pixels and odd pixels of sensor line separately for each color in the form of 6-channel signals in total.

Figure 7:
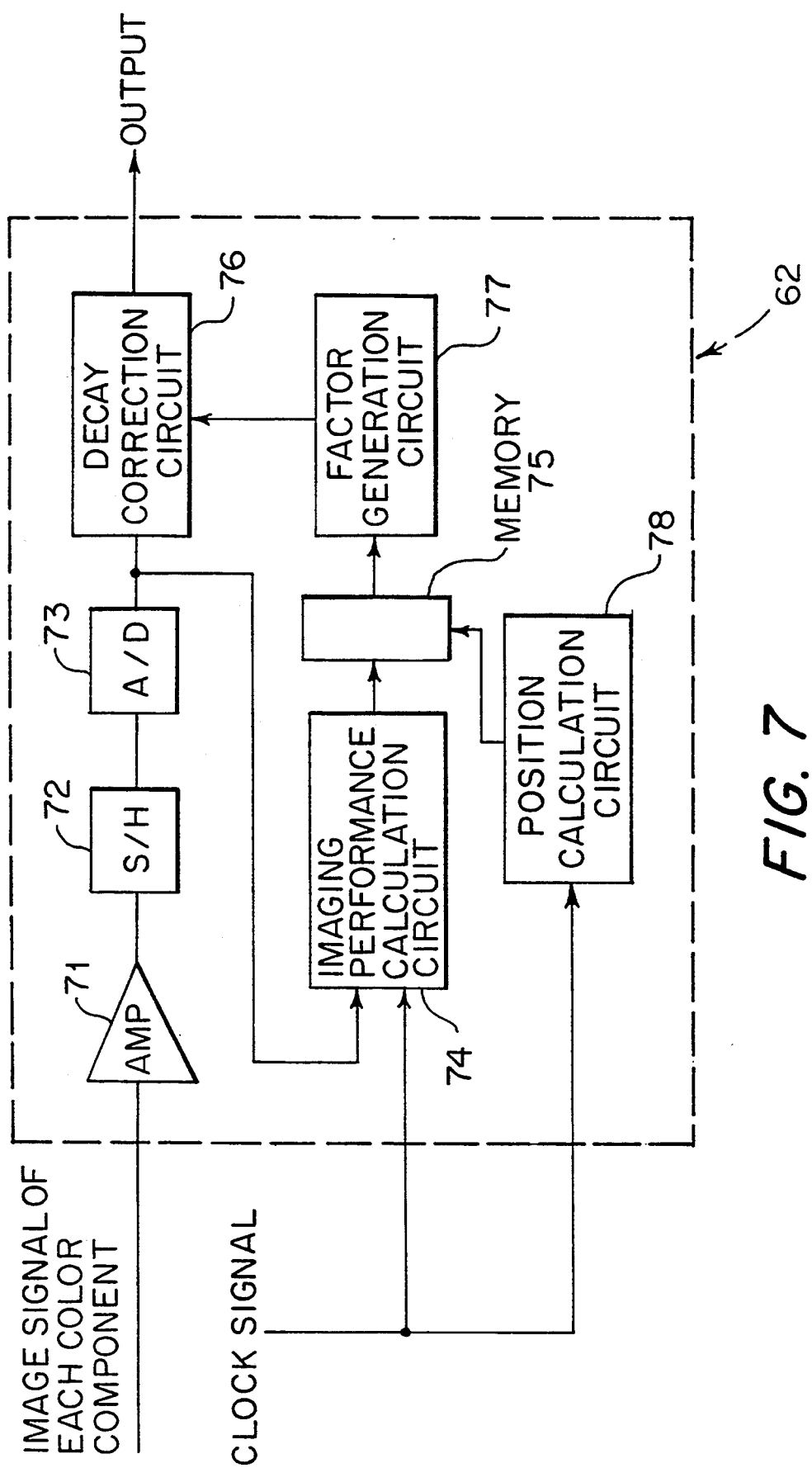
FIG. 7 As a block diagram of the correction circuit based on the first embodiment.

FIG. 7 shows an example of arrangement of the correction circuit 62 used in this embodiment. In the processing step of reading the imaging performance assessment pattern 50, the image signal of each color from the image sensor 40 is amplified by an amplifier 71, rid of noises by means of a sample-hold circuit 72, and converted into digital data by an A/D converter 73. The image data produced from the imaging performance assessment pattern 50 is then processed by an imaging performance computation circuit 74, which calculates the modulation, for each color component, of the ladder pattern of the imaging performance assessment pattern 50, for example (refer to Japanese Patent Unexamined Publication No. 2-146571). The resulting imaging performance information for each position in the field angle direction of the optical imaging system is stored in a memory 75.

In the processing step of reading image information of the text 22, the image signal of each color from the image sensor 40 is amplified by the amplifier 71, rid of noises by the sample-hold circuit 72, converted into digital data by the A/D converter 73, and fed to a decay correction circuit 76. The decay correction circuit 76 bases the image processing on a m-by-n digital filter, for example, which receives an operating factor from a factor generation circuit 77.

Figure 8:
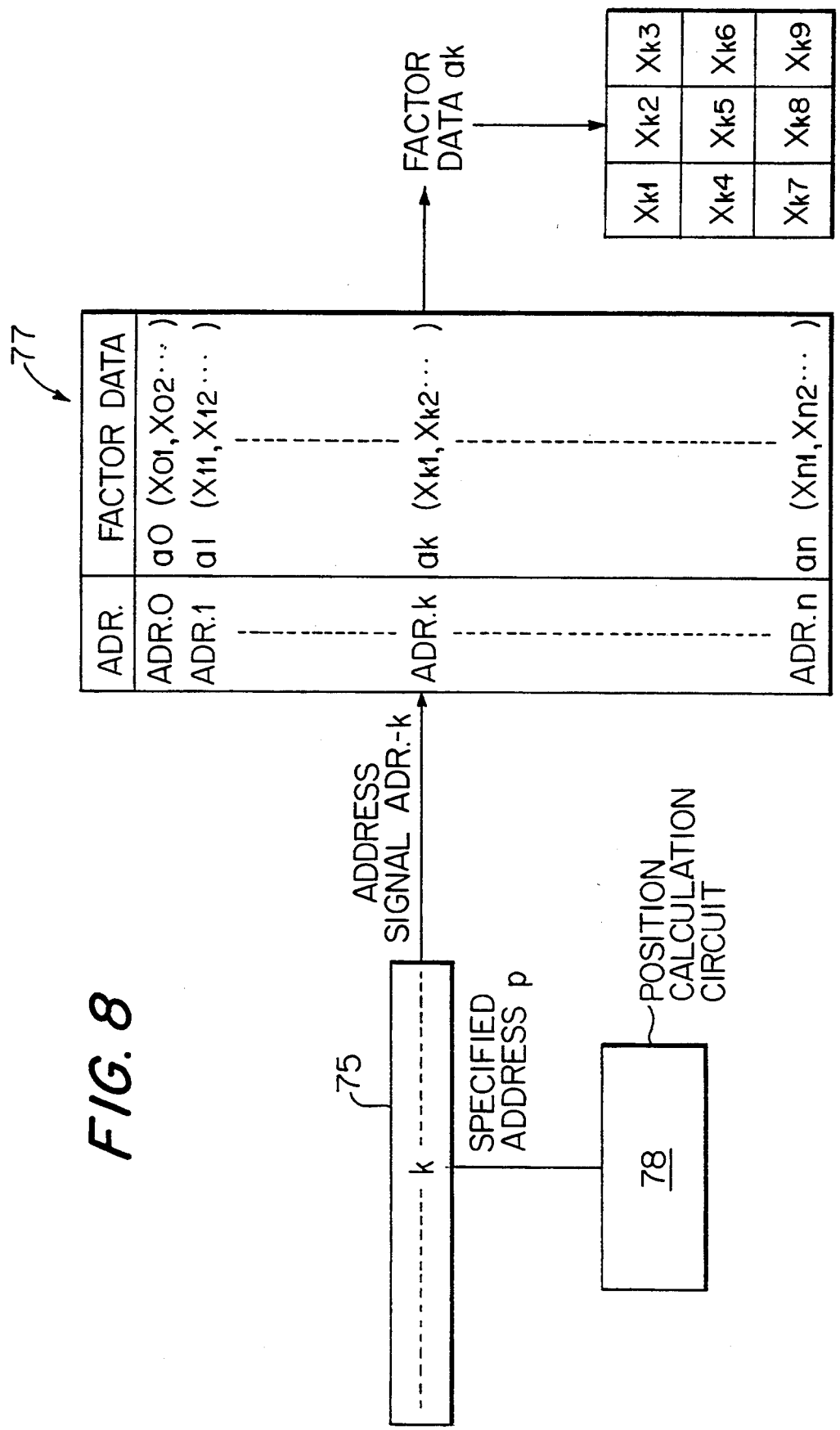
FIG. 8 is a diagram used to explain the operation of the correction circuit of the first embodiment.

In FIG. 8, indicated by 78 is a position calculation circuit which determines the position of image signal on the image sensor 40, and based on the positional information P provided by the circuit 78, imaging performance information k for that position is read out of the memory 75. The factor generation circuit 77 consists of a lookup table which contains a record of factors $a_i$ (i=0, 1, ..., k, ..., n) of the decay correcting digital filter in correspondence to imaging performance information i (i=0, 1, ..., k, ..., n) as address, and it delivers a piece of factor data $a_k$ in response to the entry of a piece of imaging performance information as an address signal Adr—k. Consequently, the decay correction circuit 76 has its digital filter factor set accordingly.

As a result, the image signal of each color component at each position of the image sensor 40 is corrected against decay based on the imaging performance information for that position during the passage through the decay correction circuit 76.

Embodiment 2

Figure 9:
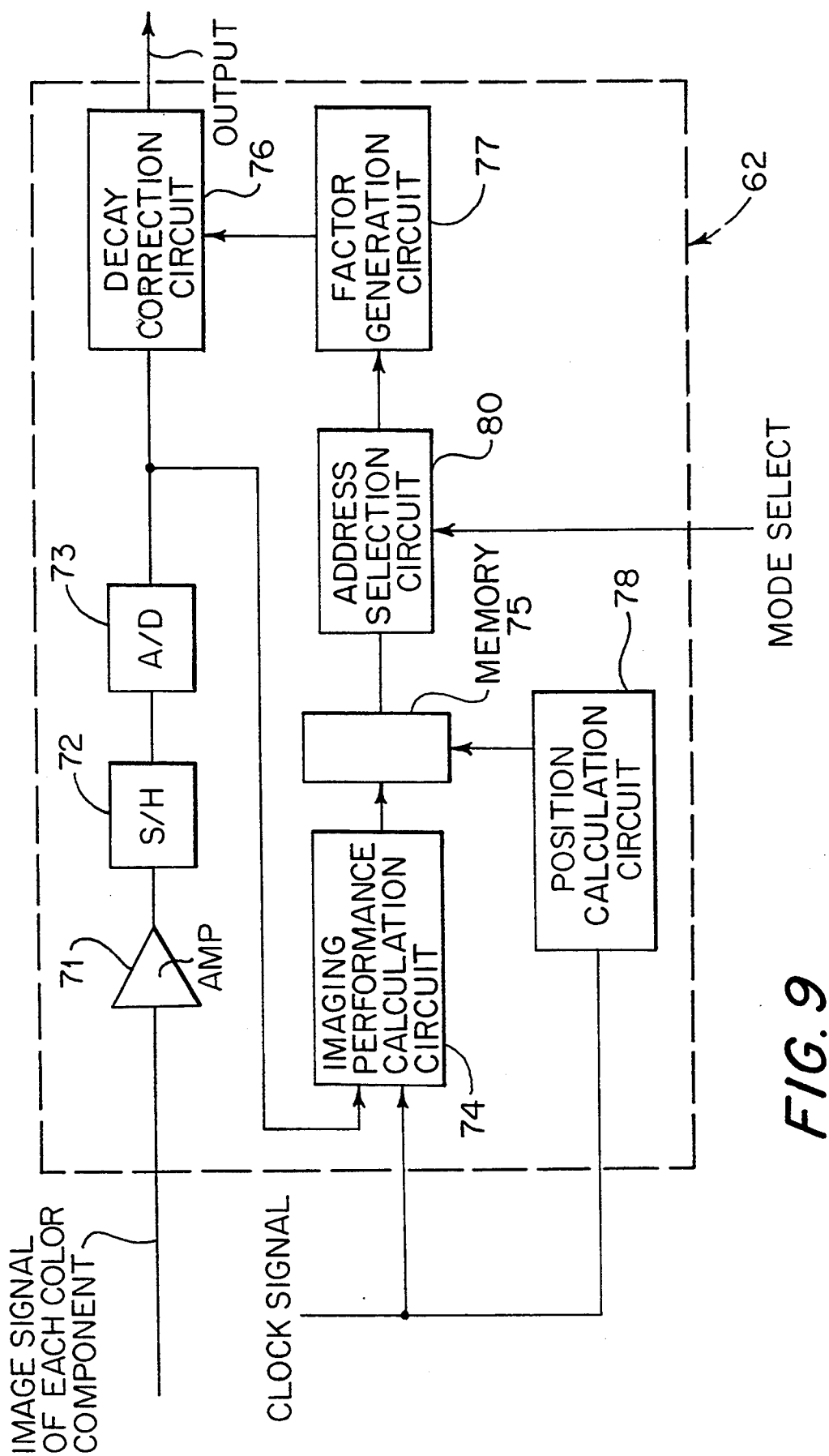
FIG. 9 As a block diagram of the correction circuit based on a second embodiment of this invention.

FIG. 9 shows the correction circuit 62 based on the second embodiment of this invention. The arrangement of the correction circuit 62 is basically the same as that of the first embodiment, with an exception being that an address switching circuit 80 is provided between the memory 75 and the factor generation circuit 77.

Figure 10:
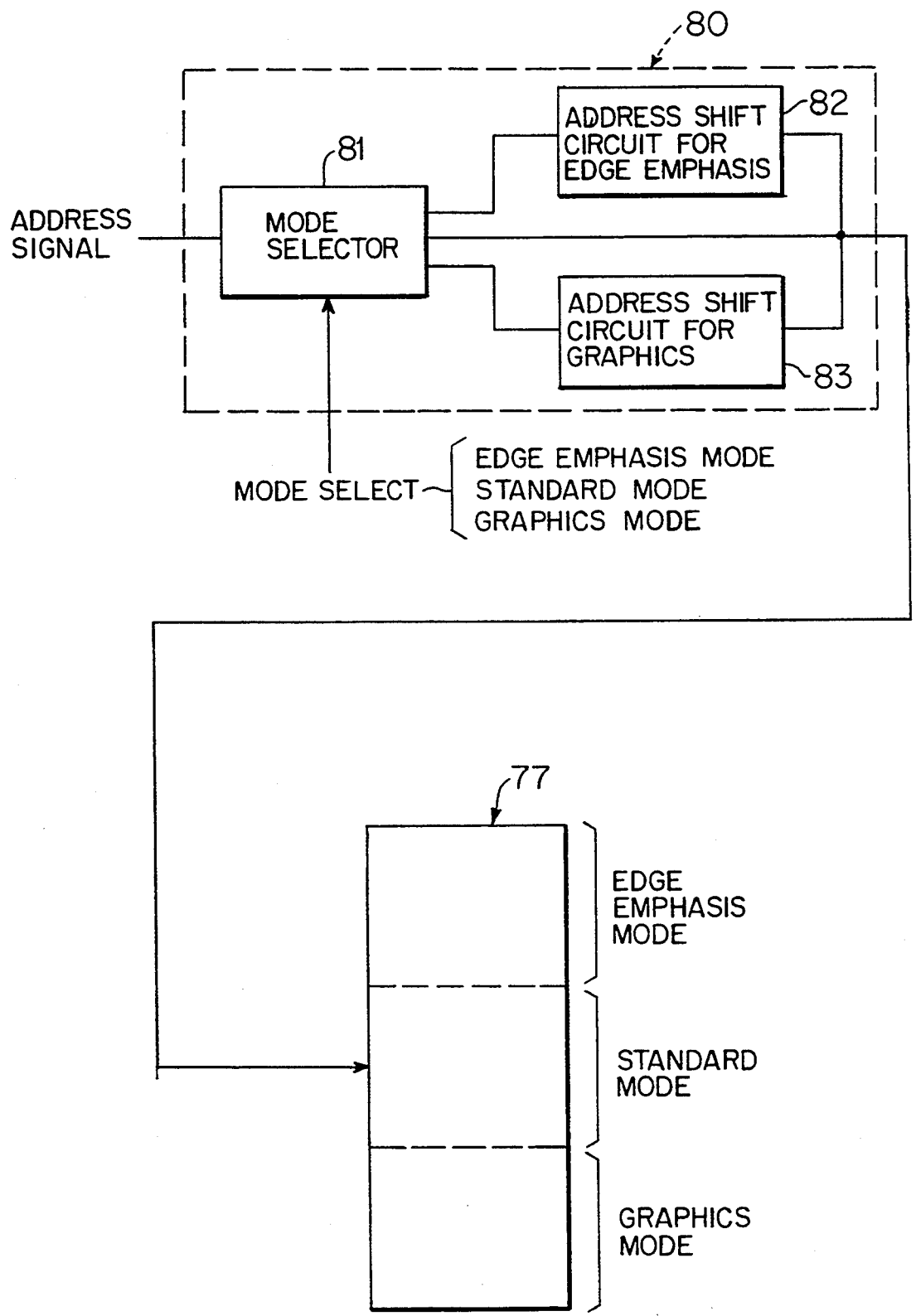
FIG. 10 is a diagram used to explain the operation of the correction circuit of the second embodiment.

The address switching circuit 80, as shown in FIG. 10, consists of a mode selector 81 which diverts the address signal from the memory 75 in response to the mode selection signal (operational modes include the edge emphasis mode, standard mode and graphics mode in this embodiment), an address alteration circuit 82 which alters the address signal to match the edge emphasis mode, and an address alteration circuit 83 which alters the address signal to match the graphics mode. In the standard mode, the input address signal is fed intact through the address switching circuit 80.

In this embodiment, the sets of factor data are stored in the fields of individual modes of the table in the factor generation circuit 77. The altered addresses for the individual modes have a certain shift relation which is implemented through the addition and subtraction by the address alteration circuits 82 and 83. Accordingly, the factor generation circuit 77 delivers the factor data to the decay correction circuit 76 in response to the address signal which is altered depending on the mode. The edge emphasis mode is selected for correcting the decay of an image signal produced from a literal text, and the graphics mode is selected for correcting the decay of an image signal produced from a pictorial text so that the picked-up image is smoothed.

Embodiment 3

Figure 11:
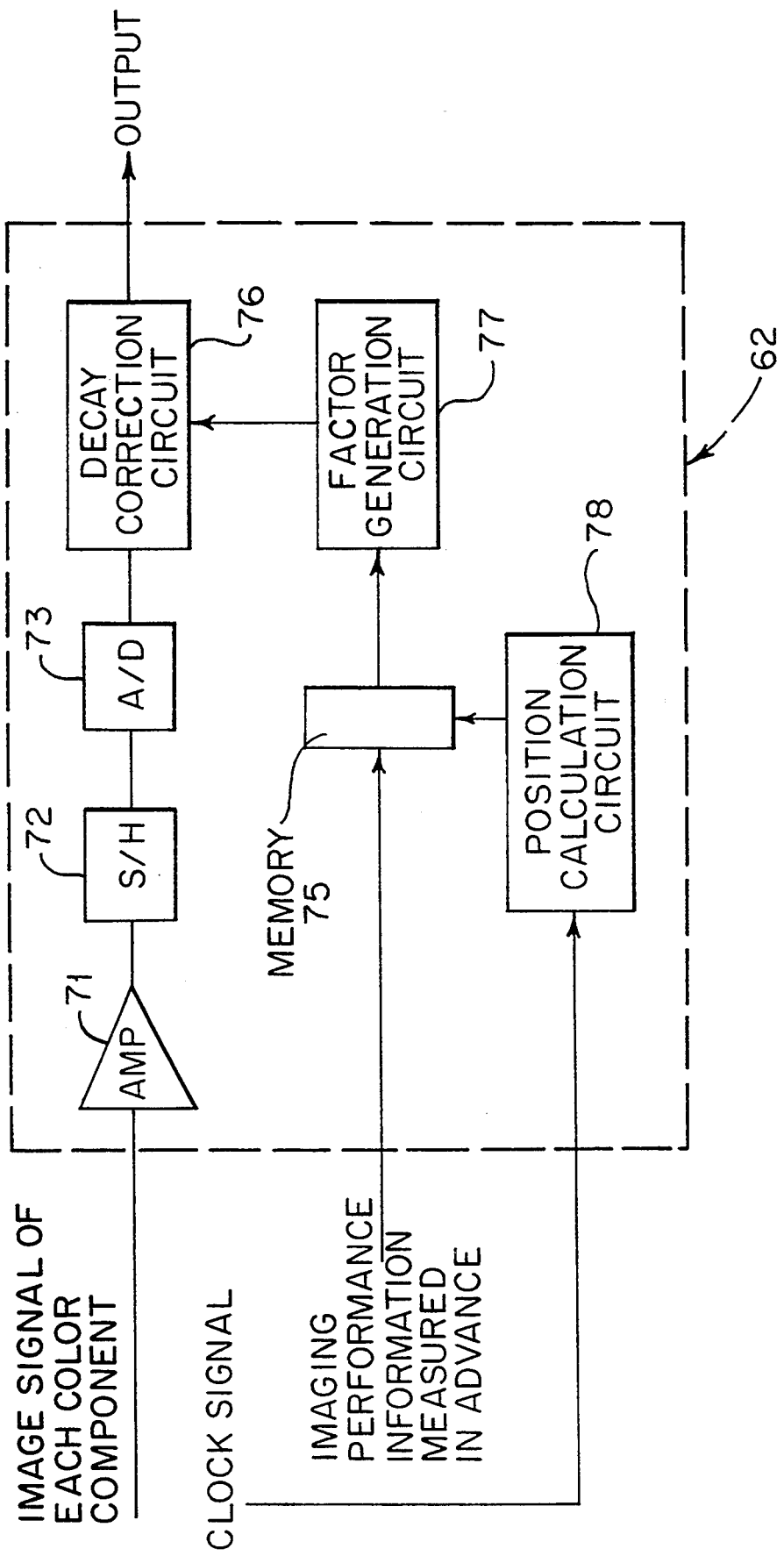
FIG. 11 is a block diagram of the correction circuit based on a third embodiment of this invention.
Figure 12:
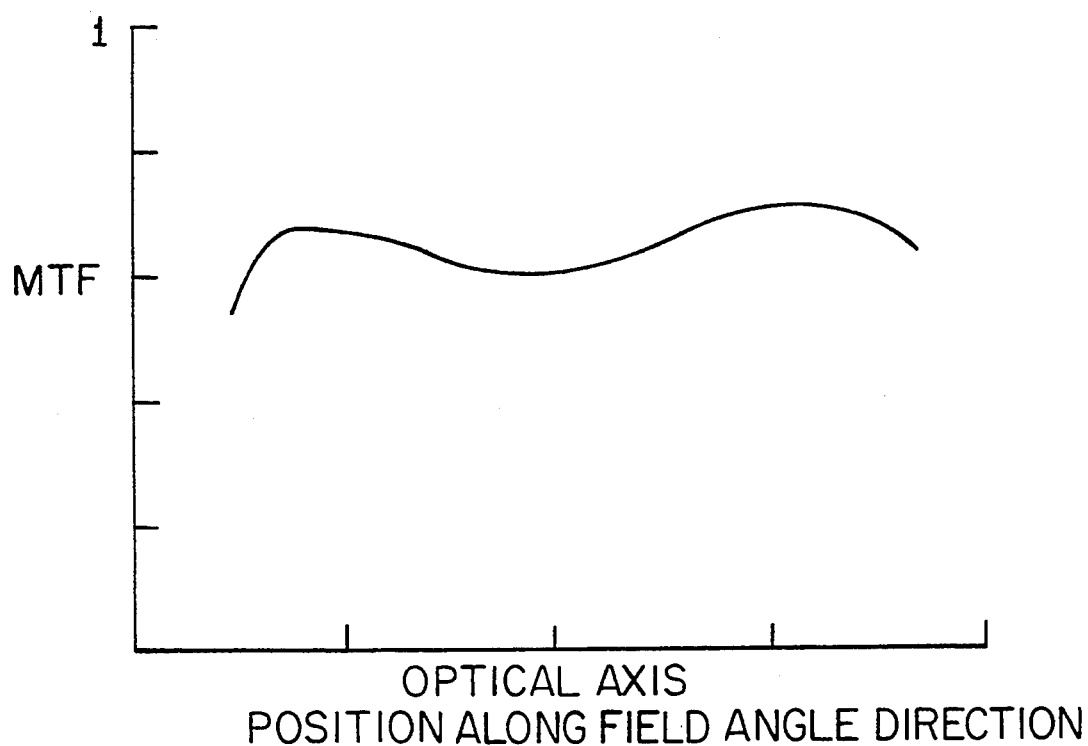
FIG. 12 is a graph showing an example of the imaging performance of the optical imaging system.
Figure 13:
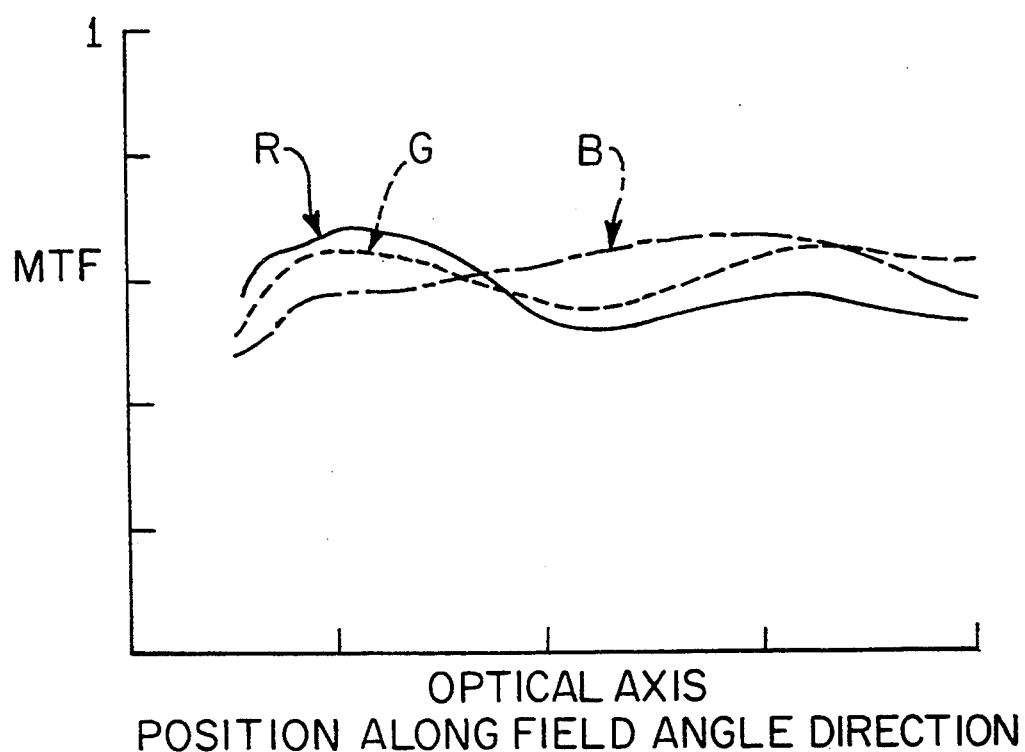
FIG. 13 is a graph showing an example of the imaging performance for individual colors of the optical imaging system.

FIG. 11 shows the correction circuit 62 based on the third embodiment of this invention. The foregoing correction circuits 62 of the first and second embodiments, in which the imaging performance assessment pattern 50 is read and the imaging performance information is calculated by the imaging performance computation circuit 74, are capable of providing accurate imaging performance information specific to each machine at the expense of a complex circuit arrangement.

In contrast, the correction circuit 62 of this embodiment is designed to store in the memory 75 the imaging performance information of optical imaging system which has been measured in advance by means of a standard measuring system. Consequently, the imaging performance assessment pattern 50 and imaging performance computation circuit 74 are eliminated and the processing steps for obtaining the imaging performance information is eliminated, whereby the structure and operation of the image reader are simplified.

As described above, according to this invention, the decay of image signal caused by the optical imaging system can be corrected appropriately in accordance with the imaging performance information at each position along the field angle direction of the optical imaging system, whereby high-quality image information can be obtained.

According to this invention, the decay of image signal caused by the optical imaging system can be corrected appropriately in accordance with the imaging performance information of each color component at each position along the field angle direction of the optical imaging system, whereby high-quality color image information can be obtained.

According to this invention, the imaging performance information is calculated based on the information produced by reading the imaging performance assessment pattern, whereby the imaging performance of the optical imaging system of each specific machine can be set accurately and thus the decay of image can be corrected accurately.

According to this invention, the imaging performance information which has been measured in advance with a standard measuring system is stored in the memory and it is read out for the decay correction, whereby the structure of image reader can be simplified.

According to this invention, the degree of correction for the image signal is varied in steps to match various operation modes including edge emphasis mode and graphics mode, whereby the decay of image can be corrected in optimal manner and the quality of reproduced image can be enhanced.

What is claimed is:

1. An image reader for reading the image of an original text placed on a platen by illuminating the text surface continuously with a slit-shaped light beam produced by an illumination light source, and focusing the slit-shaped reflected light beam from the text surface on a linear image sensor by means of an optical imaging system, wherein said image reader further includes position detection means for detecting the position of image signals produced by said image sensor from the focused reflected light beams on said image sensor along a scanning direction(s) thereof;

imaging performance setting means for setting imaging performance information of said optical imaging system for the position of image signals detected by said position detection means; and decay correction means for correcting the decay of the image signal in accordance with the imaging performance information set by said imaging performance setting means.

2. An image reader for reading the image of an original text placed on a platen by illuminating the text surface continuously with a slit-shaped light beam produced by an illumination light source, and focusing the slit-shaped reflected light beam from the text surface on a linear image sensor by means of an optical imaging system, wherein said image reader further includes position detection means for detecting the position of image signals produced by said image sensor from the focused reflected light beam, on said image sensor along a scanning direction(s) thereof;

color component detection means for detecting color components of the image signal;

imaging performance setting means for setting imaging performance information of said optical imaging system for each color component detected by said color component detection means and for the position of the image signals detected by said position detection means; and decay correction means for correcting the decay of the image signals of each color component in accordance with the imaging performance information set by said imaging performance setting means.

3. An image reader according to claim 1 or 2, wherein said imaging performance setting means comprises means for reading an imaging performance assessment pattern to produce pattern information and calculating the imaging performance information based on the pattern information.

4. An image reader according to claim 1 or 2, wherein said imaging performance setting means comprises means for storing imaging performance information, which has been measured in advance, in a memory, and reading the imaging performance information out of said memory for decay correction.

5. An image reader according to claim 1 or 2, wherein said decay correction means comprises means for varying the degree of decay correction in accordance with an operational mode set by a mode selection means.

6. An image reader according to claim 1 or 2, wherein said imaging performance setting means comprises:

imaging performance calculation means for calculating a modulation of an image performance assessment pattern in a field angle direction of the optical imaging system;

memory means for storing the calculated modulation; and factor generation means for generating a predetermined factor corresponding to a value read out of the memory means corresponding to a location determined by the position detecting means;

wherein said decay correction means corrects the image signals based on the predetermined factor.

* * * * *